United States Patent [19]

Inaba et al.

[11] Patent Number: 4,683,482

[45] Date of Patent: Jul. 28, 1987

[54] ION GENERATING DEVICE AND METHOD OF MANUFACTURING SAME

[75] Inventors: Yutaka Inaba, Kawasaki; Yujiro Ando, Yokohama, both of Japan

[73] Assignee: Canon Kabushiki Kaisha, Tokyo, Japan

[21] Appl. No.: 930,047

[22] Filed: Nov. 12, 1986

Related U.S. Application Data

[63] Continuation of Ser. No. 711,178, Mar. 13, 1985, abandoned.

[30] Foreign Application Priority Data

Mar. 19, 1984 [JP] Japan .................................. 59-51035

[51] Int. Cl.[4] .............................................. G01D 15/06

[52] U.S. Cl. .................................... 346/159; 250/426; 400/119

[58] Field of Search ......................... 346/159; 250/426; 101/DIG. 13; 358/300; 400/119

[56] References Cited

U.S. PATENT DOCUMENTS

| | | | |
|---|---|---|---|
| 4,160,257 | 7/1979 | Carrish | 346/159 |
| 4,365,549 | 12/1982 | Fotland et al. | 346/159 |
| 4,408,214 | 10/1983 | Fotland et al. | 346/159 |
| 4,409,604 | 10/1983 | Fotland et al. | 346/159 |
| 4,415,403 | 11/1983 | Bakewell | 346/159 |
| 4,460,257 | 7/1979 | Carrish | 346/159 |
| 4,558,334 | 12/1985 | Fotland | 346/159 |

*Primary Examiner*—Arthur G. Evans
*Attorney, Agent, or Firm*—Fitzpatrick, Cella, Harper & Scinto

[57] ABSTRACT

Ion generating device includes plural first electrodes extending in a first direction; plural second electrodes extending in the second direction to constitute a matrix; a third electrode so disposed that the second electrodes lie between the first electrodes and the third electrode, the third electrode having apertures corresponding to the matrix; a first dielectric member disposed between the first electrodes and the second electrodes; a second dielectric member disposed between the second electrodes and third electrode and having plural apertures corresponding to the matrix, which apertures each have a cross-sectional area generally decreasing toward the third electrode. A method of manufacturing the same includes the steps of providing an assembly constituted by the first electrodes, the second electrodes and the first dielectric member interposed therebetween; bonding a photosensitive sheet to the second electrodes and bonding a conductive sheet to the photosensitive sheet; forming apertures corresponding to the matrix in the conductive sheet; and exposing the photosensitive sheet with the conductive sheet having the apertures functioning as mask and then removing the exposed portions to form apertures in the photosensitive sheet to provide the second dielectric member.

6 Claims, 11 Drawing Figures

ION GENERATING DEVICE AND METHOD OF MANUFACTURING SAME

This application is a continuation of application Ser. No. 711,178 filed Mar. 13, 1985 now abandoned.

BACKGROUND OF THE INVENTION

The present invention relates to an ion generating device usable for an electrostatic recording or the like and a method of manufacturing the same.

It is known, as disclosed in U.S. Pat. No. 4160257, for example, that ions are generated at a high electric current density and are selectively extracted and applied onto an electrically chargeable member so as to charge the chargeable member (recording medium) with an image, which is used for an electrotatic printing or the like.

FIG. 1 is a cross-sectional view of a discharging device usable with such a printing. The device includes a plurality of first electrodes 11, a number of second electrodes 12 and a third electrode 13, arranged in the order named as shown in FIG. 1. The first electrodes function as inducing electrodes and each extend in a first direction, parallel to the surface of the drawing of FIG. 1. The second electrodes function as discharging electrodes in the form of finger electrodes and each extend in a direction which is different from the first direction, somewhat perpendicular to the surface of the drawing so that a matrix is formed by those first and second electrodes. The third electrode 13 is provided with anumber of apertures corresponding to the matrix. The first electrodes 11 and the second electrodes 12 sandwich a first dielectric member 14. Also, the second electrodes 12 and the third electrode 13 sandwich a second dielectric member 15. The second dielectric member 15 has a number of apertures 16 corresponding to the apertures 17 of the third electrode 13. An AC voltage is applied between a selected first electrode 11 and a selected second electrode 12, whereby positive and negative ions are generated adjacent to the second electrode 12 at the cross-overpoint of the matrix determined by the selected first electrode 11 and the selected second electrode 12. Between the second electrode 12 and the third electrode 13, a bias voltage is applied so that only the ions that have the polarity determined by the polarity of the bias voltage are extracted out of the positive and negative ions generated. The extracted ions pass through the aperture 16 of the second dielectric member 15 and through the aperture 17 of the third electrode 13 to electrically charge the chargeable member (not shown) disposed opposed to the third electrode 13. By selectively driving the first electrodes 11 and the second electrodes 12 in the manner described above, a dot-matrix electrostatic recording is performed.

The electrostatic recording using this process is advantageous. However, there is no good method of manufacturing the discharger, particularly for mounting the second dielectric member 15 and the third electrode 13 after the first electrode 11, the first dielectric member 14 and the second electrodes 12 are assembled into a unit.

SUMMARY OF THE INVENTION

It would be considered, as a method of doing this, that the second dielectric member 15 with the apertures 16 and the third electrode 13 with the apertures 17 are manufactured as separate members, and then the former is aligned with and bonded to the second electrode 12, whereafter the third electrode 13 is aligned with and bonded to the second dielectric member 15. However, there is a possibility that the apertures 16 and the apertures 17 are clogged by the bonding agent or adhesive when they are bonded. Additionally, two fine alignment operations are required, necessiating a complicated manufacturing process.

The accuracy of the alignment of the aperture 16 and the aperture 17 with the cross-overpoints of the matrix, directly influences the quality of the image, and therefore, a method has been desired which can provide the discharging device having a highly accurate alignment.

Further, the inventors have found that the ions having the polarity to be extracted can be diverged toward the chargeable member, which results in an unclear dot image formed on the chargeable member.

Accordingly, it is a prinpal object of the present invention to provide a method wherein the alignment is highly accurate with simple manufacturing process.

It is another principal object of the present invention to provide an ion generating device wherein the flow of ions is converged.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring now to FIGS. 2A–2G, the manufacturing steps of the discharging device or ion generating device, according to an embodiment of the present invention, are illustrated.

Figure 1:
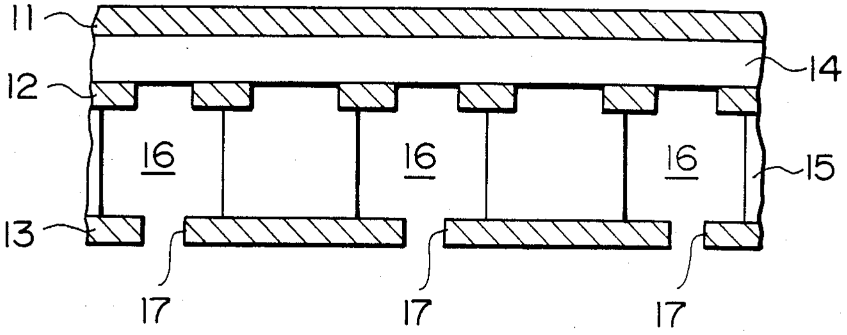
FIG. 1 PRIOR ART
FIG. 1 is a cross-sectional view of an ion generator.
Figure 2A:
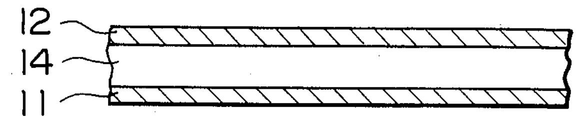
FIGS. 2A–2G illustrate an ion generating device manufacturing process according to an embodiment of the present invention.
Figure 2B:
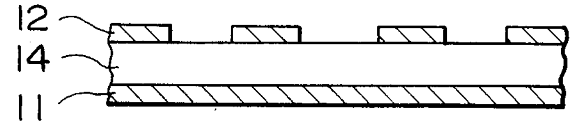

In FIG. 2A, foil-like metal sheets for the first electrode 11 and the second electrode 12 have been bonded to the opposite sides of the first dielectric member 14. FIG. 2B shows the state after the assembly shown in FIG. 2A has been subjected to a photo-lithography to form the sheets into the first electrodes 11 and the second electrodes 12, respectively. The method of manufacturing upto this point may be the same as disclosed in U.S. Pat. No. 4408214. Briefly, an adhesive is applied to opposite sides of the first dielectric member in the form of a mica plate having the thickness of approximately 25 microns, and the foil sheets of stainless steel having the thickness of approximately 25 microns are bonded to the respective sides of the mica plate by pressing them to the mica plate by rubber rolls, and thereafter, patterns corresponding to the first and second electrodes are formed on the respective sides using photo-resist which exhibits a positive property with respect to photochemical reaction.

Figure 2C:
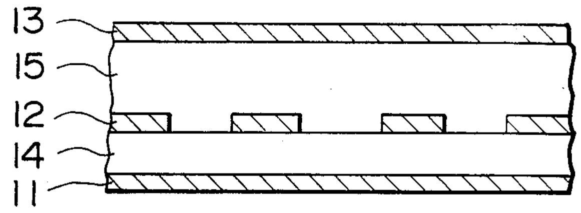

To the second electrode (12) side of the assembly shown in FIG. 2B, a photosensitive resin member 15 which will become the second dielectric member is bonded. The photosensitive resin member 15 is of, for example, AZ (tradename), available from HOECHST, Japan. The photosensitive member 15 is positive with respect to photochemcial reaction, that is, the portions exposed to the light become soluble by a developer. It has the thickness of 50–300 microns, preferably 100–200 microns. To the photosensitive member 15, a conductive sheet in the form of foil of approximately 25 microns thickness is bonded with a cold-setting adhesive (urethane resin), for example, Takelac A606 (tradename) available from Takeda Yakuhin Kogyo Kabushiki Kaisha, Japan (FIG. 2C). The metal sheet may be of a stainless steel or gold. The metal sheet is subjected to a further processing to be the third electrode 13.

Figure 2D:
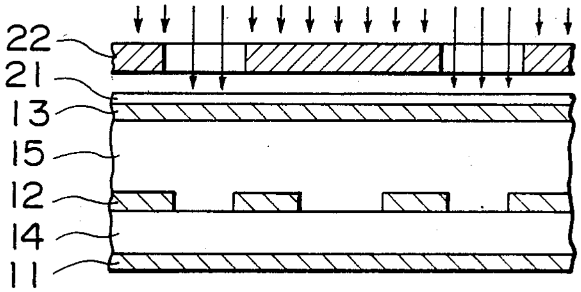

As shown in FIG. 2D, a photoresist 21 is applied to the outer surface of the metal sheet 13. The photoresist 21 may be of the same material as of the photosensitive member 15. In this embodiments, the same material, i.e., "AZ" (tradename) available from HOECHST, Japan was used. Then, a mask 22 is used for masking the photoresist 21 except for such portions as will be apertures 17 of the third electrode 13, and then the photoresist 21 is subjected to illumination through the mask 22, as shown in FIG. 2D. The openings of the mask 22 are precisely aligned with the cross-over points of the matrix, i.e., the cross-over points between the first electrodes and the linear cavities existing between two finders of each of the second (finger) electrodes 12. The description has been made with respect to the case where the positive type photoresist 21 is used, but this is not limiting, and a negative type resist may be used which, for example, is "OMR" (tradename) available from Tokyo Ohka Kogyo Kabushiki Kaisha, Japan. In this case, however, the mask 22 is such that it covers the portions which will be the apertures 17 of the third electrode 13.

Figure 2E:
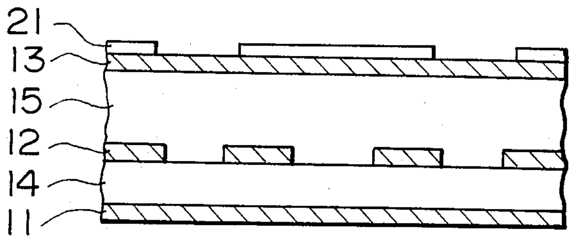

FIGS. 2E shows the assembly after the resist has been removed from the exposed portions thereof by a known method.

Figure 2F:
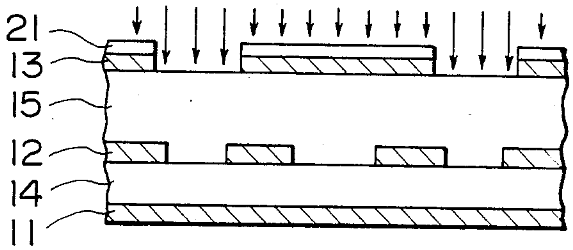
Figure 2G:
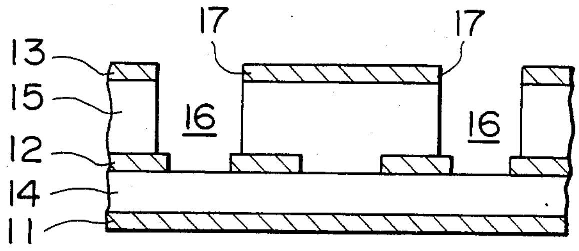

Then, the metal sheet or foil 13 is etched by dipping it into corrosive liquid, such as ferric chloride, phosphoric acid or the like to form apertures in the metal sheet 19 (FIG. 2F). In this embodiment, the phosphoric acid was used, and the etching period was 30 minutes.

Then, the assembly is exposed to uniform light at the metal sheet or photoresist side. At this time, the third electrode 13 functions as a mask so as to expose the photosensitive resin layer 15 only at such portions as correspond to the apertures 17. Since the photosensitive resin is of positive nature, the exposed portions thereof become soluble. When the assembly is dipped into suitable liquid, such as trichloroethane for a period of time, for example, 30 sec., only those portions of the photosensitive resin layer 15 as correspond to the apertures 17 of the third electrode 13, are removed so that independent apertures 16 are provided in the layer. Thus, the second dielectric member 15 with independent apertures 16 is formed between the second electrode and the third electrode.

Figure 4:
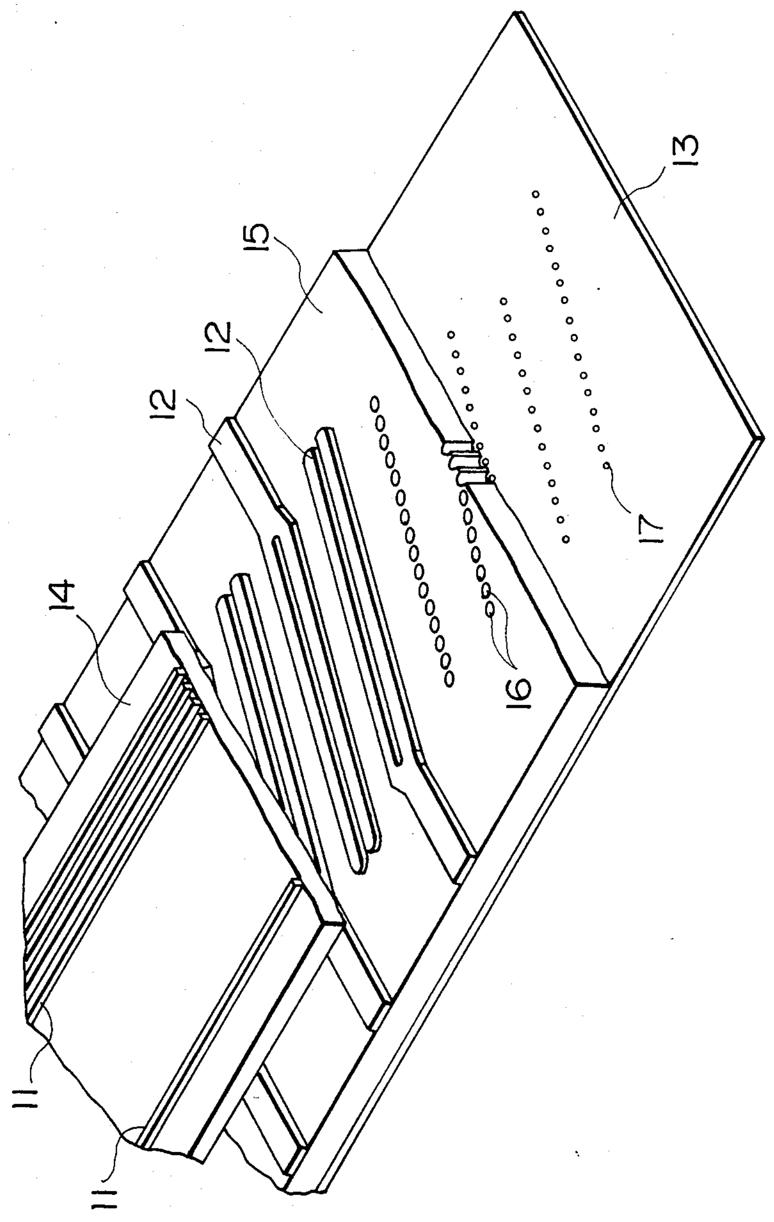
FIG. 4 is a perspective view, partly broken away, of the ion generating device manufactured by a method according to the first embodiment of the present invention.

FIG. 4 is a perspective view of the ion generating device manufactured by the method according to the embodiment described above. The detailed description thereof is omitted by assigning the same reference numeral as in the foregoing.

When the ion generating device is used in an electrostatic recording apparatus, it is preferable that the electric lines of force provided by the electric field formed between the second electrode 12 and the third electrode 13, are converged along the direction of the ion travel. This is because, with such shape of the electric field, it can be avoided that the ion beams directed by the electric field expand or diverge after they pass through the aperture 17 of the third electrode before they reach the chargeable member, with the result of an unclear dot latent image.

Figure 3A:
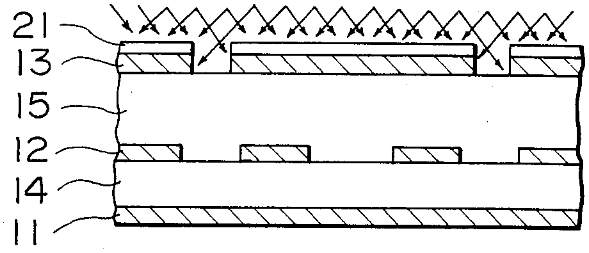
FIG. 3A illustrates a step of an ion generating device manufacturing process according to another embodiment of the present invention.
Figure 3B:
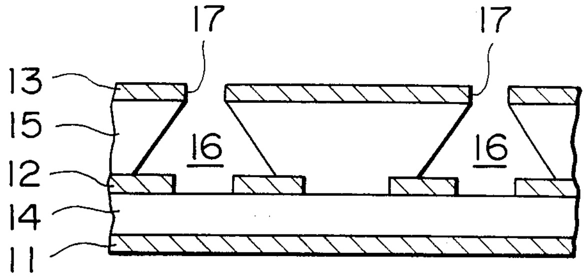
FIG. 3B is a cross-sectional view of the ion generating device according to an embodiment of the present invention.

FIG. 3B is a cross-sectional view of the ion generating device according to an embodiment of the present invetion. The ion generating device includes the first electrodes 11 extending in the first direction, the second electrodes 12 extending in the second direction which is different from the first direction, to constitute the matrix and the third electrode 13 so disposed that the second electrodes 12 lie between the first electrodes 11 and the third electrode 13. The third electrode has a number of apertures 17 corresponding to the matrix. Between the first electrodes 11 and the second electrode 12, there is provided a first dielectric member 14. Between the second electrode 12 and the third electrode 13, the second dielectric member 15 is disposed. The second dielectric member 15 has the apertures 16 corresponding to the matrix, which apertures each have a cross-sectional area generally increasing toward the third electrode. Thus, the aperture 16 is of generally a frusto-conical shape.

Therefore, the dimension of the aperture 17 of the third electrode is smaller than the dimension of the aperture 16 of the second dielectric member 15 at the side contacted to the second electrode 12, or the aperture 16 has such a shape that the cross-sectional area thereof generally converged or decreased toward the aperture 17. Because of this shape, the electric field, existing between the second electrode 12 and the third electrode 13 when the voltage is applied therebetween, is such that the electric lines of force thereof are converged toward the aperture 17 of the third electrode 13. Therefore, the ion beams discharging through the aperture 17 converges toward the chargeable member, that is, toward the recording medium (not shown) opposed to the third electrode. The angle formed between the axis of the above described frusto-conical shape and the generating line thereof is 0–45 degrees, more preferably, 0–12 degrees. It is further preferable that the diameter of the aperture 17 is smaller than the clearance between the third electrode 13 and the second electrode 12.

The description will now be made with respect to a method of manufacturing such an ion generating device as shown in FIG. 3B, according to another embodiment of the present invention. In the method of this embodiment, the same steps are taken as with the method of the first embodiment, except for the step of exposing the photosensitive resin layer 15, that is, the step shown in FIG. 2F.

In this step, the present embodiment employs the light projection as shown in FIG. 3A. Unlike the first embodiment of manufacturing method, the light is not incident perpendicularly to the photosensitive resin layer 15. Rather, the light is incident on the exposed surface of the photosensitive resin layer 15 in a radial fasion. This inclined exposure can be achieved by, for example, inclining the assembly at the predetermined angle with respect to exposure beams, which are preferably collimated, and rotating the assembly about an axis which is parallel to the exposure beam. The angle of inclination, that is, the angle of the surface of the photosensitive resin layer 15 with respect to a plane perpendicular to the axis, is larger than 0 degrees but smaller than 45 degrees, preferably larger than 0 degree but smaller than 12 degree. Then, the assembly is dipped into the liquid as in the step of the first embodiment decribed in conjunction with FIG. 2G. The liquid and dipping period of time may be the same. Thus, according to this embodiment of the manufacturing method, the discharging device having the construction described with FIG. 3B is provided.

As described in the foregoing, according to the method of the present invention, the number of alignment operations which require highly accurate alignment is reduced, and the alignment operation can be made accurate. Further, the manufacturing process is simplified, and the possibility can be avoided that the adhesive cloggs the apertures.

Further, according to the ion generating device according to the present invention, the flow of the ions can converge toward the chargeable member so that fine and sharp dot can be formed.

While the invention has been described with reference to the structures disclosed herein, it is not confined to the details set forth and this application is intended to conver such modifications or changes as may come within the purposes of the improvement or the scope of the following claims.

What is claimed is:

1. An ion generating device, comprising:

a plurality of first electrodes extending in a first direction;

a plurality of second electrodes extending in a second direction which is different from the first direction, to constitute a matrix;

a third electrode so disposed that said second electrodes lie between said first electrodes and the third electrode, said third electrode having apertures corresponding to the matrix;

a first dielectric member disposed between said first electrodes and said second electrodes; and a second dielectric member disposed between said second electrodes and third electrode, said second dielectric member having a plurality of apertures corresponding to the matrix, which apertures each have a cross-sectional area generally decreasing toward said third electrode.

2. A device according to claim 1, wherein an inside surface of the apertures of the second dielectric member is inclined with respect to an axis of the aperture, and wherein the angle of inclination is 0–45 degrees.

3. A device according to claim 2, wherein the angle of inclination is 0–12 degrees.

4. A device according to claim 1, wherein the apertures in the second dielectric member are independent from each other.

5. A device according to claim 1, wherein the apertures of the third electrode each have a diameter smaller than the clearance between said second electrodes and said third electrode.

6. A device according to claim 1, wherein said ion generating device further comprising means for applying an AC voltage between a selected first electrode and a selected second electrode, and means for applying a bias voltage between said selected second electrode and said third electrode.

* * * * *

UNITED STATES PATENT AND TRADEMARK OFFICE

CERTIFICATE OF CORRECTION

PATENT NO. : 4,683,482

DATED : July 28, 1987

INVENTOR(S) : YUTAKA INABA, ET AL.

It is certified that error appears in the above-identified patent and that said Letters Patent is hereby corrected as shown below:

ON THE TITLE PAGE,

[56] REFERENCES CITED

Line 6, delete "4,460,257 7/1979 Carrish...346/159".

COLUMN 1

Line 12, "4160257," should read --4,160,257,--.
Line 17, "electrotatic" should read --electrostatic--.
Line 32, "anumber" should read --a number--.
Line 42, "cross-overpoint" should read --crossover point--.
Line 60, "electrode" should read --electrodes--.

COLUMN 2

Line 6, "necessiating" should read --necessitating--.
Line 9, "cross-overpoints" should read --crossover points--.
Line 17, "prinpal" should read --principal--.
Line 59, "upto" should read --up to--.
Line 60, "4408214." should read --4,408,214.--.

UNITED STATES PATENT AND TRADEMARK OFFICE

CERTIFICATE OF CORRECTION

PATENT NO. : 4,683,482 Page 2 of 2
DATED : July 28, 1987
INVENTOR(S) : YUTAKA INABA, ET AL.

It is certified that error appears in the above-identified patent and that said Letters Patent is hereby corrected as shown below:

COLUMN 3

Line 30, "cross-over" should read --crossover--.
Line 31, "cross-over" should read --crossover--.
Lines 32-33, "find-ers" should read --fingers--.
Line 42, "FIGS. 2E" should read --FIG. 2E--.
Line 61, "13, are" should read "13 are--.

COLUMN 4

Line 7, "13, are" should read "13 are--.
Line 45, "converges" should read --converge--.
Line 48, "above described" should read
--above-described--.
Line 67, "fasion." should read --fashion.--.

COLUMN 5

Line 7, "degree" should read --degrees--.
Line 8, "degree." should read --degrees.--.
Line 21, "cloggs" should read --clogs--.
Line 25, "dot" should read --dots--.

Signed and Sealed this

Fifth Day of January, 1988

*Attest:*

DONALD J. QUIGG

*Attesting Officer* *Commissioner of Patents and Trademarks*